H. N. ANDERSON.
METHOD OF MAKING GEARS.
APPLICATION FILED AUG. 30, 1916.

1,273,125.

Patented July 23, 1918.
4 SHEETS—SHEET 2.

Harold N. Anderson,
Inventor

By Kerr, Page, Cooper & Hayward,
Attorneys

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

METHOD OF MAKING GEARS.

1,273,125.  Specification of Letters Patent.  Patented July 23, 1918.

Original application filed August 28, 1913, Serial No. 787,215. Divided and this application filed August 30, 1916. Serial No. 117,598.

*To all whom it may concern:*

Be it known that I, HAROLD N. ANDERSON, a citizen of the United States, residing at Cleveland, county of Cuyahoga, State of Ohio, have invented certain new and useful Methods of Making Gears, of which the following is a full, clear, and exact description.

This application is a division from my pending application, Serial No. 787,215, in which I have claimed as articles of manufacture gears having physical characteristics which inhere from forming the teeth by rolling a heated blank against a toothed die. In the present application I claim the method by which such gears are made.

One object of my invention is to produce gears which are stronger and more accurate and durable than have heretofore been produced. Another object is to provide a simple and economical method of forming gear teeth.

Briefly, my herein described method of forming teeth on gears comprises rolling a heated blank against a toothed die and concurrently causing relative movement of approach between them. During the rolling operation I maintain synchronous relations between the teeth on the die and the developing teeth on the blank, so that the teeth of the die enter the blank in a radial path from the time the tooth forming operation begins until it is completed. In the apparatus herein shown I maintain synchronism by driving the die and blank at a fixed speed ratio, so that the lineal velocity of the imaginary line on the blank which will be its pitch-line when it becomes a finished gear is equal to the velocity of the pitch-line of the die. I preferably form the gears from drop forged steel blanks, which may be used just as they come from the forging dies. Crucible steel castings and other kinds of blanks may be used, however.

Among the advantages derived from my method are the following: Gears of types which have heretofore been difficult or expensive to make, such as herring bone gears, may be made as easily and as accurate as the simplest spur gears. It may also be used for making bevel gears although the machines here disclosed are not adapted to this use. I have, however, in my Patents Nos. 1,240,914, 1,240,916, 1,240,917, 1,240,918, disclosed machines for rolling bevel gears. By my method gears may be made of materials heretofore impracticable for the purpose; for example, high manganese steel. With certain materials the chilling effect of the die may be employed to harden the teeth to a considerable extent, particularly their surfaces. As a large number of gears may be rolled without appreciable deterioration of the die, the cost of the dies is almost negligible. It is practicable, therefore, to expend whatever is necessary to secure a high degree of accuracy and perfection in the dies. The metal of the blank is kneaded and compressed by the die teeth, but without injurious shock; it is mechanically refined. Mechanical refinement is effected by subjecting metal to heavy pressure and it consists mainly in breaking up the crystals, mixing them more intimately together and interrupting the cleavage planes along which the crystals would separate under a strain. When the metal is refined by rolling there is more or less elongation of the crystals in the direction of the rolling, which by making the transverse cleavage planes short relative to the longitudinal cleavage planes increases the longitudinal strength of the metal. Moreover, imperfections such as blow holes and shrinkage cracks are flattened and elongated in the direction of the rolling, and if the heat is sufficient there is more or less elimination of such imperfections by their sides becoming welded together. What remains of these imperfections become mere lengthwise seams which have no effect on the longitudinal strength of the metal. The presence of these seams suggests the term "fibrous," which is commonly used in reference to the texture of rolled metal. The action of the die teeth is analogous to that of the rolls of a rolling mill. They exert a heavy pressure on the metal of the blank and as the area of contact is always small the pressure is highly concentrated. As the volume of metal acted upon is very small, never more than the content of one tooth, the effect is substantially uniform throughout the tooth. I prefer to have the original diameter of the blank about equal to that of the pitch-circle of the finished gear, the metal displaced below the pitch-line being sufficient to form the addenda of the teeth, The displaced metal is gradually forced outward and at the same time compressed by the die teeth, and the fibers of the metal are brought into approximate parallelism to the surfaces of the teeth so that when the teeth are finished their fibrous structure has a form resembling their own. This is fully explained in my Patent No. 1,199,332. The pressure of the die teeth is always normal i. e., perpendicular to the tooth surfaces, so that whatever elongation of the crystals occurs is more or less parallel to the tooth surfaces. There is a correlation of the crystalline and fibrous structures, so to speak, giving the metal its greatest strength in the direction of the normal working strain on the teeth. The blank is rotated a considerable number of revolutions while the teeth are being formed, so the amount of work done on a tooth at each revolution is quite small. Moreover, the time elapsing between successive operations on a tooth enables the elements of the metal to adjust themselves to their changed condition; these are periods of seasoning, so to speak. This gradual development of the teeth, and the high temperature at which the rolling is done, promote stability in the metal, and when the gear is finished there are practically no internal strains which will tend to warp it during heat treatment.

The machines shown in Figs. 1 to 4 inclusive are shown and fully described in my pending application, Serial No. 643,010, filed Aug. 8, 1911.

Figure 1:
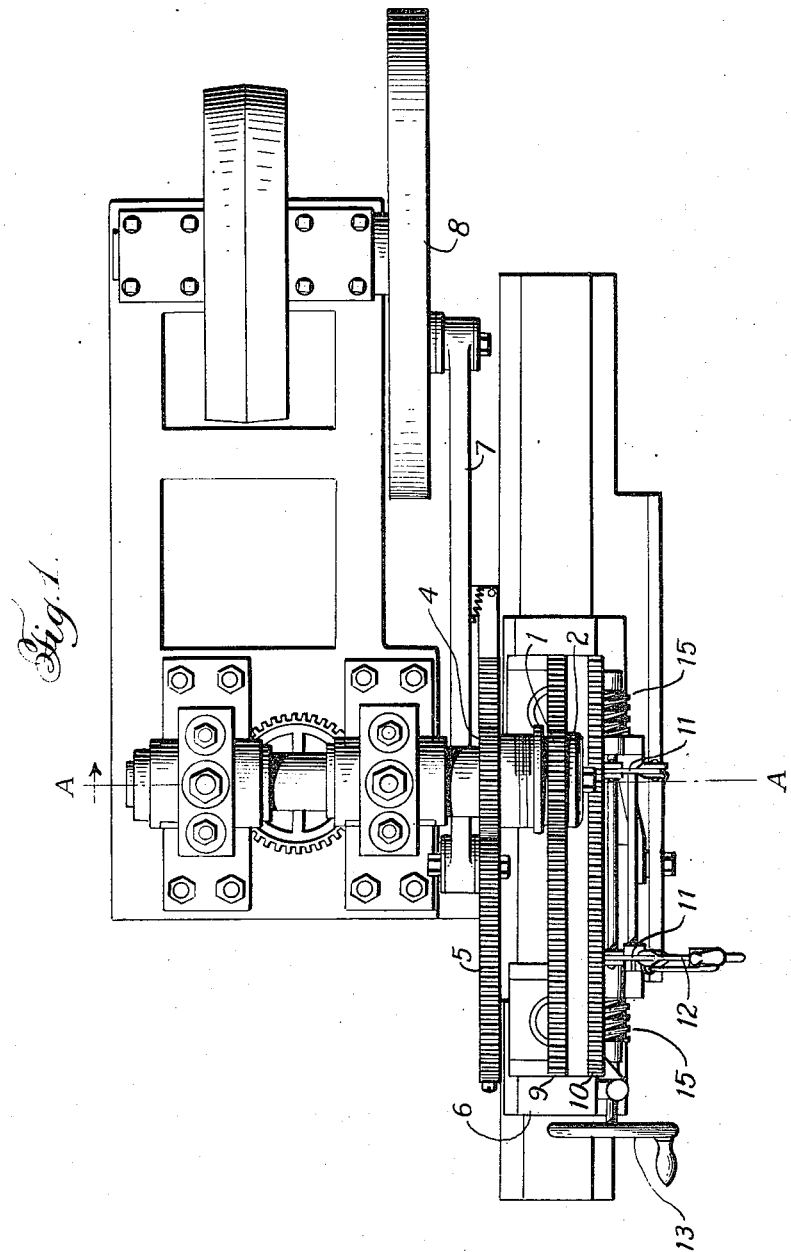
Figure 1 is a plan of a machine adapted to make gears by my method; in this machine the die is in the form of a rack.
Figure 2:
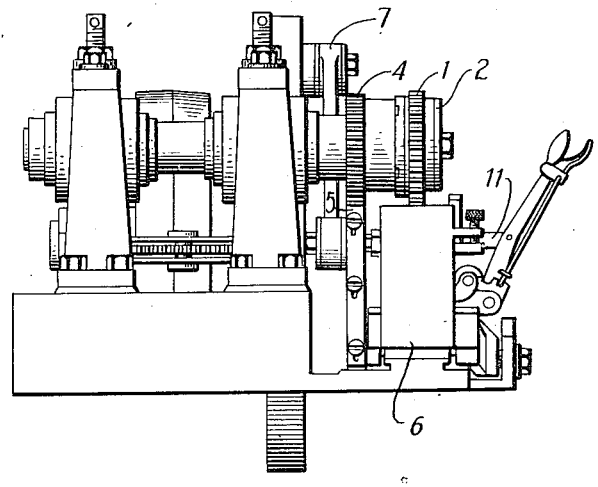
Fig. 2 is an end elevation.
Figure 3:
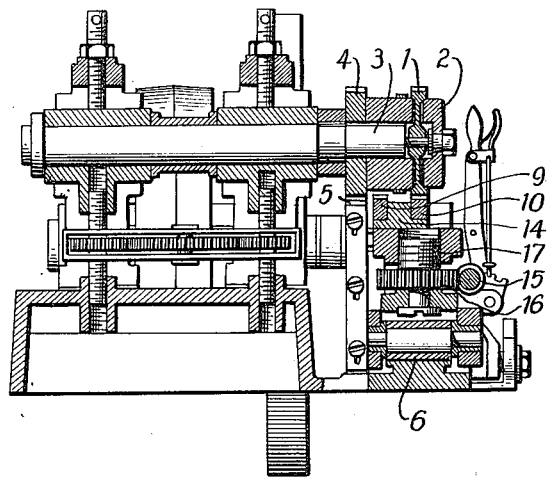
Fig. 3 is a section along line A A of Fig. 1.

Referring to Figs. 1, 2 and 3, the blank 1 is carried by a blank holder 2 mounted on a shaft 3 which also carries a gear 4. This gear enmeshes with a driving rack 5 carried by a carriage 6, which carriage is reciprocated by the pitman 7 and fly wheel 8 driven by any suitable driving means. Mounted on this carriage 6 are two racks, 9 and 10, which can be moved transversely relative to the driving rack 5 by links 11 controlled by a lever 12 as shown, so that the "breaking-down" die rack 9 and the "finishing" die rack 10 can operate upon the blank 1 in turn. A relative movement of approach between the die racks and the blank during the rolling operation is effected by rotating the hand wheel 13, thereby moving the die rack support 14 upwardly by means of the worms 15, worm wheels 16 and screw spindles 17.

In operation, the reciprocating movement of the carriage 6 is imparted to the driving rack 5 and the die racks 9 and 10. The gear 4 is enmeshed with and rotated by the rack 5, thereby rotating the shaft 3 and blank 1. By operating the lever 12 either the breaking-down rack or the finishing rack is brought into operation, and the teeth thereof are caused to sink increasingly deeper into the blank by suitably operating the hand wheel 13 which controls the lifting of the rack support 14. Since the gear 4 and the blank rotate as a unit a circle drawn on the blank, of the same diameter as the pitch circle of the gear 4, would necessarily have the same lineal velocity as the said pitch circle from start to finish of the tooth forming operation; therefore, since the depth of enmeshment of the gear and rack 5 is constant, and the die racks cannot move longitudinally relative to the rack 5, it is clear that the lineal velocity of the blank is equal to that of the racks and therefore to that of their pitch lines.

Figure 4:
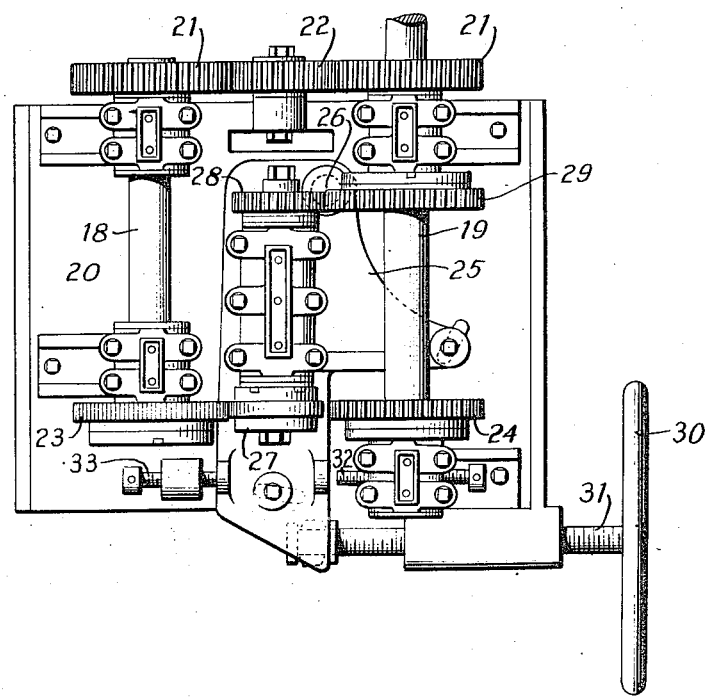
Fig. 4 is a plan of a machine also adapted to make gears by my method, in which the die is circular.

Referring to the machine shown in Fig. 4, shafts 18 and 19 are rotatably mounted in bearings carried by a bed plate 20, each shaft having rigidly secured thereto a gear 21, which gears are connected together by an intermediate gear 22. Shaft 18 carries a toothed breaking-down die roller 23, and shaft 19 carries a toothed finishing roller 24. A plate 25 lies upon the bed plate 20 and is pivotally secured thereto at 26. A shaft is journaled in a bearing carried by plate 25, and on one end thereof a blank holder 27 is mounted. A gear 28 is rigidly secured to the other end of the shaft and is enmeshed with a gear 29 rigidly secured to shaft 19. The axis of the pivot 26 is in line with the point where the pitch circles of gears 28 and 29 touch, and also in line with one edge of gear 28. Obviously, the plate 25 can be swung on the pivot 26 without varying the distance between the axis of gear 28 and the axis of the pivot 26; therefore, the depth of enmeshment of gears 28 and 29 at the side lying upon the axis of the pivot does not vary when the plate 25 moves from which it follows that the speed ratio between the blank and the finishing roller is fixed whether the blank is enmeshed with it, with the breaking-down roller, or is anywhere between these extremes. Furthermore, since the shafts 18 and 19 are geared together the speed ratio between the blank and the breaking-down roller is also fixed. As will be readily understood, the plate 25 is moved to and fro between the shafts by the hand wheel 30 which operates the screw 31. Adjustable stops 32 and 33 limit the movement of the plate 25.

When in operation the machine is driven by means which is not shown, acting upon shaft 19. A blank is placed in the machine and by means of the hand wheel it is pressed against the breaking-down roller; having received sufficient of that treatment it is brought over into engagement with the finishing roller. From what has already been said it is obvious that the lineal velocity of the pitch line of the blank is the same as that of the roller during the entire tooth forming operation.

Figure 5:
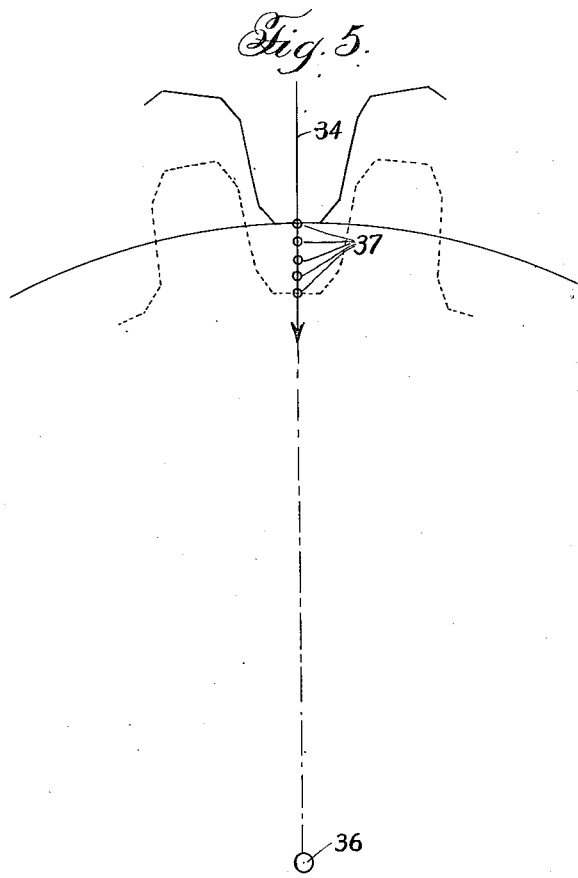
Fig. 5 is a diagram illustrating the radial entrance of the die teeth into the blank.

The action of the teeth of the die upon the metal of the blank will now be explained in detail, with reference to Figs. 5 and 6. The position of a tooth of the die relative to the blank at the commencement of the tooth forming operation is illustrated in full lines in Fig. 5, and the arrow 34 is a line which if extended upwardly would pass through the center of the die (assuming the die is in this case circular). Once during each revolution of the die this arrow points directly at the center 36 of the blank. It is then just midway between two teeth on the blank; or if before teeth have been formed it is midway between positions eventually to be occupied by teeth. If as the tooth is caused to sink deeper and deeper into the metal of the blank a succession of dots 37 could be made on the blank, each dot being made opposite the point where the median line 34 crosses the end of the tooth and when the arrow points at the center 36, a line drawn through these dots would be straight and radial to the center of the blank. The foregoing would be equally true were the die a rack; in that case the line 34 would be perpendicular to the pitch-line of the rack. That the tooth of the die does enter the blank along this radial path is due to the synchronous relations maintained between the die and the blank; i. e., to the fact that the pitch line velocities of the die and blank are equal. As the tooth enters the metal of the blank it gradually displaces the metal without cutting the grain, so that at the end of the tooth-forming operation the fiber of the metal in the tooth and at the bottom of the tooth will have taken substantially the form indicated in Fig. 6. The die teeth roll in and roll out of the spaces on the blank, in the manner characteristic of gear teeth, and since they traverse the same path each time, a path consisting of two like curves diverging from the median line, it follows that they act equally on both sides of the space. That is, both faces of the die teeth displace the same quantity of metal and therefore render the metal on each side of the space equally compact and coherent. Because of the fact that a die tooth moves toward the axis of the blank on entering and away from the axis on leaving a space, there is a slight though negligible difference in the effect produced on the two sides of the space. It might be more correct to say there is a slight difference in the manner of producing substantially the same effect. This difference is neutralized, however, in the machine shown in Figs. 1, 2 and 3 by its alternating treatment of the blank. It can, of course, be neutralized in the machine shown in Fig. 4 by alternating the direction of rotation, but since the treatment of and effect on both sides of the space is substantially the same, alternating the direction of rotation is not necessary.

Figure 6:
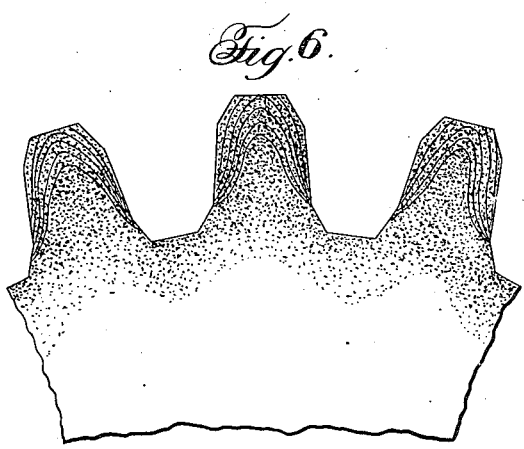
Fig. 6 illustrates diagrammatically the result of the die action.

Fig. 6 shows a segment of a toothed gear made in accordance with the invention, the fine irregular lines illustrating the manner in which the grain of the metal follows the contour of the teeth and the stippled portion of the surface indicating the increased density of the metal due to the method of forming the teeth. It will be realized from this that by means of my improved method the fiber of the metal is worked into a form approximately like that of the teeth, the metal of the teeth being also compacted to give a denser and more refined grain. Importance is attached to the teeth of the die entering the blank in a radial path, because if the teeth enter the metal of the blank in curvilinear path they will distort the metal of the blank so that the teeth of the finished gear will not be a compact, coherent mass with the body and therefore will not present the characteristics of strength and durability which are present in gears formed according to my improved method.

It is to be understood that I am not limited to the specific apparatus shown as a means for carrying out my method of making gears.

What I claim is as follows.

1. The method of forming teeth upon a blank by means of a toothed die, which consists in subjecting the periphery of the blank to a rolling action against the die, with a contemporaneous movement of approach between the blank and the die, the teeth of the die being made to enter the blank in a radial path during the entire tooth forming operation.

2. The process of forming and simultaneously hardening gear teeth, which consists in rolling a heated blank against a cool toothed die and gradually pressing the die teeth into the blank while maintaining synchronous relations between the die teeth and the developing teeth on the blank.

3. A method of making gears, comprising rolling a heated blank against a toothed die and gradually pressing the die teeth into the blank while maintaining synchronous relations between the die teeth and the developing teeth on the blank.

4. A method of making gears, comprising rolling a heated blank against a toothed die and pressing the die teeth into the blank while maintaining fixed velocity ratio between them.

5. A method of forming teeth on gears, comprising rolling a blank against a toothed die while gradually pressing the die teeth into the blank and repeatedly alternating the direction of rolling.

6. A method of making gears, comprising rolling a heated blank successively against a toothed breaking down die and a toothed finishing die while maintaining a definite relationship between the teeth on the die and the developing teeth on the blank.

7. A method of making gears, comprising rolling a blank successively against different toothed dies while maintaining a definite relationship between the teeth on the die and the developing teeth on the blank.

8. A method of forming teeth on gears, comprising rolling a blank successively against different toothed dies and repeatedly alternating the direction of the rolling.

9. A method of forming teeth on gears, comprising rolling a blank successively against different toothed dies while gradually pressing the die teeth into the blank and repeatedly alternating the direction of the rolling.

10. A method of forming teeth on gears, comprising rolling a blank successively against a toothed breaking down die and a toothed finishing die while maintaining synchronous relations between the die teeth and the developing teeth on the blank.

11. A method of forming teeth on gears, comprising rolling a heated blank and a toothed die against each other and concurrently pressing them together so as to force the die teeth into the blank, the die teeth being made to enter and leave the blank in such manner as to impart substantially the same degree of compactness and coherence to each side of the blank teeth.

12. A method of forming teeth on gears, comprising rolling a heated blank and a toothed die against each other and concurrently pressing them together so as to force the die teeth into the blank, the die teeth being made to enter and leave the blank in such manner that both faces of the die teeth displace substantially the same quantity of metal.

HAROLD N. ANDERSON.